United States Patent [19]
Haseltine

[11] Patent Number: 5,488,508
[45] Date of Patent: Jan. 30, 1996

[54] VIGNETTING TECHNIQUE FOR IMPROVING APPEARANCE OF PARTIALLY OVERLAPPED BINOCULAR DISPLAYS

[75] Inventor: Eric C. Haseltine, Manhattan Beach, Calif.

[73] Assignee: The Walt Disney Company, Burbank, Calif.

[21] Appl. No.: 267,187

[22] Filed: Jun. 28, 1994

[51] Int. Cl.⁶ .......................... G02B 21/36; G02B 23/08; G02B 26/08; G02B 27/00
[52] U.S. Cl. .......................... 359/362; 359/363; 359/407; 359/410; 359/227; 359/235; 359/236; 359/601
[58] Field of Search .......................... 359/407, 410, 359/480, 601, 610, 630, 362, 363, 227, 233, 235, 236

[56] References Cited

U.S. PATENT DOCUMENTS

| | | | |
|---|---|---|---|
| 4,205,224 | 5/1980 | Mecklenborg | 359/482 |
| 4,729,648 | 3/1988 | Armstrong | 359/610 |
| 4,968,123 | 11/1990 | Fournier, Jr. et al. | 359/480 |
| 5,233,458 | 8/1993 | Moffitt et al. | 359/407 |
| 5,257,094 | 10/1993 | LaRussa | 359/13 |

*Primary Examiner*—Paul M. Dzierzynski
*Assistant Examiner*—Mohammad Y. Sikder
*Attorney, Agent, or Firm*—Fish & Neave; Jeffrey H. Ingerman

[57] ABSTRACT

Aperture stops are positioned in the optical train of a partially overlapped binocular display in a such a manner that overlapping portions the binocular boundaries of the left and right fields of view are substantially out of focus, and therefore do not appear as well defined, distracting contours in the visual field. The present invention is particularly well suited for use in virtual reality systems employing head mounted displays.

28 Claims, 5 Drawing Sheets

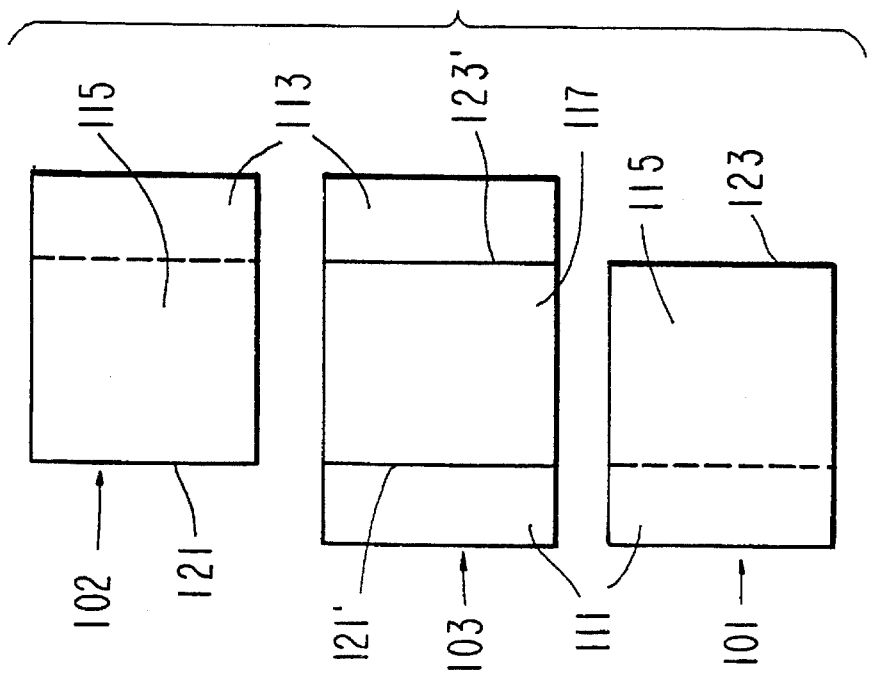
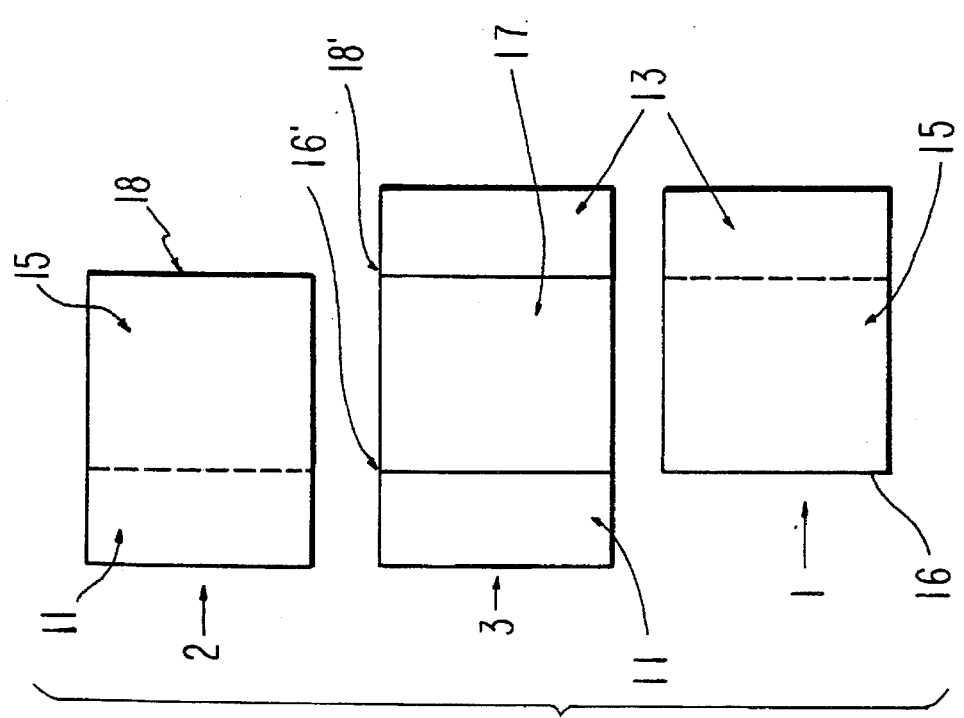

VIGNETTING TECHNIQUE FOR IMPROVING APPEARANCE OF PARTIALLY OVERLAPPED BINOCULAR DISPLAYS

BACKGROUND OF THE INVENTION

The present invention relates to virtual reality systems which provide simulated three dimensional images to an observer. More particularly, the present invention relates to method and apparatus for improving the appearance of the image viewed in a virtual reality system having a partially overlapped binocular display.

"Virtual reality" is a phrase that has been used to describe the experience of living or playing in a computer simulated environment which models a three dimensional ("3-D") virtual space (i.e., a virtual world). In virtual reality systems, an observer typically dons a set of goggle-mounted video screens or some other form of head mounted device ("HMD") on which the observer sees images of virtual world scenes.

In addition to military and commercial simulations, virtual reality systems have applicability in the entertainment industry and other areas as well. For, example, computer games, video arcade games and theme park attractions presenting a virtual reality experience through an HMD can provide an observer with a high level of fantasy and enjoyment. HMD's also can be used as advanced computer workstation displays and operator displays for telepresence and teleoperation of robotic devices, and in educational applications.

Several aspects of the design of an HMD may have substantial impact on its suitability for a particular application. For a theme park attraction presenting a virtual reality experience, for example, such aspects include the image quality and the angle of the field of view subtended by presented images. It is particularly desirable in theme park attractions and other entertainment applications that the HMD present images which are free of distracting cosmetic problems. In addition, a wide field of view (preferably greater than 50°) is desirable because an observer's sense of immersion in a virtual world increases rapidly as more of his or her peripheral vision is stimulated.

Unfortunately, enlarging the field of view of an optical system results in increased weight and increased cost, as well as decreased eye-relief (the distance between an observer's eye and the lens system), decreased viewing volume (the region of viewing space in which the observer can see the full image) and decreased resolution.

Some HMD designs have attempted to overcome some of these drawbacks by partially overlapping the left eye and right eye fields of view, instead of providing full binocular projection. This can be accomplished by shifting the optical axis of each eyepiece towards the midline, while fixing the focal plane, or by splaying the left and right focal planes away from each other. A typical HMD with partial overlap might have two 60° fields overlapped 40°, achieving a total perceived field of view of 80° (two 20° monocular fields plus the 40° binocular field). Because the brain will fuse the left and right eye fields of view into a single image, this partial overlap permits an 80° field to be displayed using 60° optics (which are lighter and less expensive, with greater eye relief, viewing volume and resolution than corresponding 80° optics).

As one might expect, the attainment of increased field of view through partial overlap is not itself without drawbacks. The principal disadvantage is a "bar" that is superimposed on the central region of the image. This bar is actually a composite virtual image of the binocular boundaries of the left and right eye images. In a typical partially overlapped binocular display, the image viewed by the observer comprises a central binocular region flanked by left and right monocular regions. The sharply focused left and right boundaries of the central binocular region may be visually distracting and objectionable to some observers. This effect may be referred to as "binocular rivalry" or "retinal rivalry". When the binocular boundaries of the left and right eye images are circular, the bar effect is known as "luning".

Some observers report that "bar" effects diminish with repeated use. However, in many applications, such as theme park entertainment, observers do not have substantial previous experience with such systems and may find the "bar" distracting or objectionable. It is thus desirable in entertainment applications to provide an image in which such effects are minimized or eliminated so an observer may readily enjoy a virtual reality experience.

In one previously known attempt to reduce binocular rivalry in partially overlapped binocular displays, a false contour line corresponding to the binocular boundaries is used to reduce the retinal rivalry of the discrepant left and right eye images. This false contour line, which may be implemented with either an electronically generated video mask, or a mechanical reticle situated in a focal plane, introduces artificial contours into the left and right images, making it appear that there is a post or other real object that is visible to both eyes.

The major drawback of this technique is that the false contours are located in the focal planes of the left and right eye images and are intentionally very conspicuous. Thus, although retinal rivalry may be reduced, observers will still perceive noticeable and distracting obstructions. For some applications, such as military aircraft displays, these obstructions might be acceptable, but for applications such as entertainment, where a sense of immersion is essential, visual obstructions are intrusive and may significantly detract from the quality of the experience.

It would therefore be desirable to greatly reduce the noticeability of the binocular boundaries of the left and right fields of view of a partially overlapped HMD.

It would also be desirable to provide an aesthetically pleasing, wide field-of-view image using medium field-of-view optics, and thereby realize the full benefits of partial overlap in an HMD.

SUMMARY OF THE INVENTION

It is therefore an object of the present invention to greatly reduce the noticeability of the binocular boundaries of the left and right fields of view of a partially overlapped HMD.

It is also an object of the present invention to provide an aesthetically pleasing, wide field-of-view image using medium field-of-view optics, and thereby realize the full benefits of partial overlap in an HMD.

The above and other objects of the present invention are accomplished by placing an aperture stop near the front surface of each eyepiece of an HMD so that the binocular boundaries of the left and right fields of view are substantially out of focus. The aperture stop is out of focus, and thus relatively inconspicuous, because the observer is focusing on distant virtual images, and also because the aperture stop may be closer to the eye than the shortest distance at which the eye is able to focus. The result of providing such an aperture stop is a significant improvement in the appearance of the composite image seen by the observer. The improved image quality and decreased noticeability of the binocular boundaries permit less overlap between left and right display channels, and therefore allow a substantially increased apparent field of view.

BRIEF DESCRIPTION OF THE DRAWINGS

The above and other objects of the present invention will be apparent upon consideration of the following detailed description, taken in conjunction with the accompanying drawings, in which like characters refer to like parts throughout, and in which:

FIG. 1 is a simplified schematic drawing depicting a divergent binocular overlapping display;

FIG. 2 is a simplified schematic drawing depicting a convergent binocular overlapping display;

DETAILED DESCRIPTION OF THE INVENTION

Figure 3A:
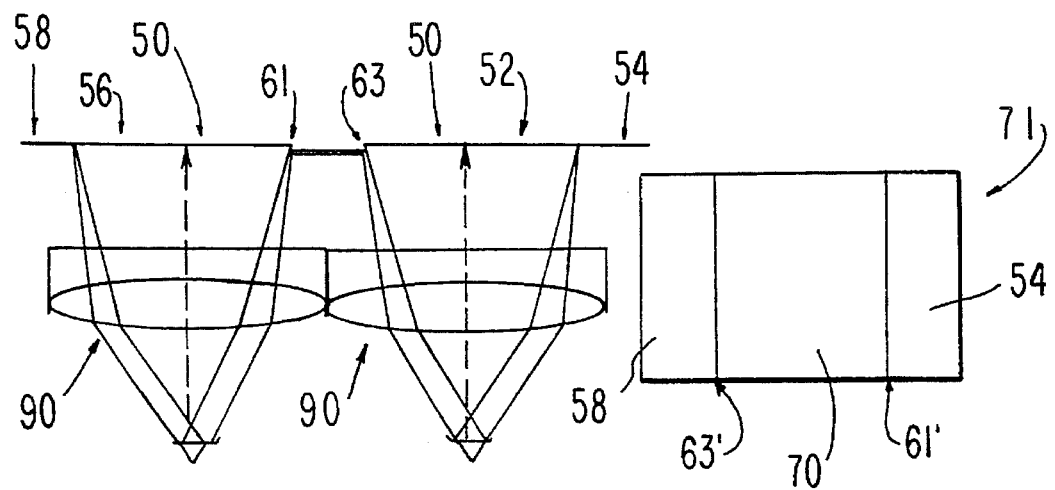
FIG. 3A–3C are simplified schematic drawings showing a divergent binocular display having an aperture stop in accordance with the present invention.

In a preferred embodiment, the present invention is realized by placing an aperture stop substantially at the front surface of the eyepieces of a partially overlapped binocular display. The aperture stop is positioned so that the observer's view of the binocular boundaries is substantially blocked, yet because the aperture stop is close to the eye, it is out of focus and practically invisible. Indeed, the aperture stop is so named because it is placed near the aperture, or exit opening, of the optical system (in this case the pupil of the observer's eye) rather than in the focal plane of the image viewed through the eyepiece. Using aperture stops in accordance with the present invention significantly reduces binocular rivalry and allows a substantial improvement in the quality of image viewed through a partially overlapped binocular display.

FIG. 1 is an example of a "divergent" partially overlapped binocular display. In a divergent system the left and right eye images are displaced laterally away from each other. That is, the right eye views right field of view 1 comprising central overlap region 15 and right monocular region 13, while the left eye views left field of view 2 comprising central overlap region 15 and left monocular region 11. The brain naturally combines the left and right fields of view to produce composite image 3 having central binocular region 17, left monocular region 11, and right monocular region 13. This corresponds to ordinary human vision in the sense that the right eye views a portion of composite image 3 on the far right (right monocular region 13) which is not seen by the left eye, and the left eye views a portion of composite image 3 on the far left (left monocular region 11) which is not seen by the right eye.

Unfortunately, a distracting "bar" is superimposed on central binocular region 17. In particular, left binocular boundary 16" and right binocular boundary 18' are in sharp focus and may be especially distracting to some observers. Left binocular boundary 16' arises from nasal boundary 16 of right field of view 1 which overlaps left field of view 2, while right binocular boundary 18' arises from nasal boundary 18 of left field of view 2 which overlaps right field of view 1.

It would be advantageous to eliminate these distracting boundaries so that a more "natural" appearing composite image could be viewed by an observer.

As an example of the amount of overlap of the right and left images, right field of view 1 and left field of view 2 each may have a field of view of 60°, 40° being in central overlap region 15 and 20° in each of left monocular region 11 and right monocular region 13. This gives composite image 3 a total field of view of 80°.

As shown in FIG. 2, it is also possible to increase the total field of view of a binocular system by "converging" the left and right fields of view. In the convergent case, the right eye views right field of view 101 comprising central overlap region 115 and left monocular region 111, while the left eye views left field of view 102 comprising central overlap region 115 and right monocular region 113. In this less intuitive case, the right eye views images on the far left (left monocular region 111) of composite image 103 which are not seen by the left eye itself. Similarly, the left eye views images on the far right (right monocular region 113) of composite image 103 which are not viewed by the right eye. However, the brain is able to combine the left and right images to form the "correct" composite image.

Unfortunately, a distracting "bar" is superimposed on central binocular region 117 in this case as well. In this convergent case, left binocular boundary 121' arises from temporal boundary 121 of left field of view 102 which overlaps right field of view 101. Similarly, right binocular boundary 123' arises from temporal boundary 123 of right field of view 101 which overlaps left field of view 102.

Once again, right field of view 101 and left field of view 102 each may have a field of view of 60°, 40° being in central overlap region 115 and 20° in left monocular region 111 and right monocular region 113, thereby giving composite field of view 103 a total field of view of 80°.

FIG. 3A shows a divergent binocular imaging system, which may preferably be part of an HMD, having two eyepieces 90 through which an observer views images in focal planes 50. The left and right eye images have been shifted away from the midline to increase the total field of view. Thus, the field of view of the left eyepiece comprises left binocular region 56 and left monocular region 58. Similarly, the field of view of the right eyepiece comprises right binocular region 52 and right monocular region 54. The brain combines the left and right fields of view to produce composite image 71 having central binocular region 70 flanked by left monocular region 58 and right monocular region 54.

The differing images viewed by each eye cause an image of nasal boundary 63 seen by the right eye and nasal boundary 61 seen by the left eye to be focused in a conspicuous portion of the right and left fields of view respectively. In composite image 71 seen by the observer, binocular boundaries 61' and 63' are visible distractions on the edges of central binocular region 70. The sharply focused binocular boundaries may also appear to some observers as a "bar" superimposed on central binocular region 70.

Figure 3B:
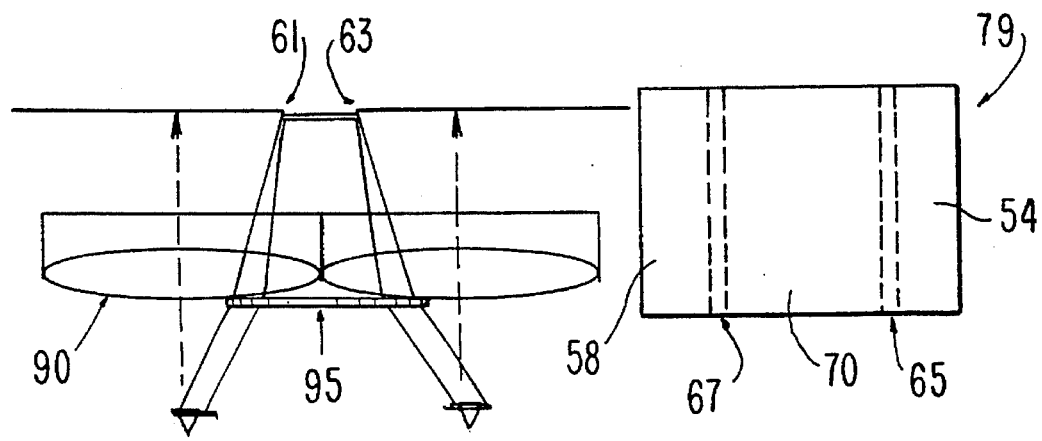

In FIG. 3B, in accordance with the present invention, aperture stop 95 has been placed substantially at the front surface of each eyepiece in such a manner that the binocular boundaries are completely vignetted. That is, the observer's view of nasal boundaries 61 and 63 is substantially blocked by aperture 95. Although aperture stop 95 is an obstruction in the binocular field of view of each eye, it is out of focus because it is closer to the observer's eye than the normal focal range of the human eye, and also because the observer is focusing on the distant virtual images of the focal planes several diopters away. Thus, nasal boundaries 65 and 67, formed by aperture stop 95, in composite image 79 are out of focus and are found to be practically invisible, and consequently far less distracting, to observers than the sharply focused boundaries of FIG. 3A. In this manner, aperture 95 mimics the effect of increasing the size of the observer's nose since the nose is the nasal boundary of the left and right fields of view in human vision, and, being positioned close to the eyes, is normally out of focus.

The improved image quality and decreased noticeability of the binocular boundaries permit decreased overlap between left and right display channels, and therefore allow a substantially increased apparent field of view. This makes the use of aperture stops in accordance with the present invention ideal for theme park attractions where it is important to stimulate as much peripheral vision as possible in order to immerse the observer in a virtual world.

In order to reduce to a minimum any undesired vignetting, it will be apparent to those skilled in the art that the shape of the aperture stop may preferably be configured to match the shape of the binocular boundary. In the preferred example shown in FIG. 3B, the aperture stop has vertical edges; for circular fields of view, the stop would preferably be semi-circular, corresponding to the shape of the binocular boundaries.

Figure 3C:
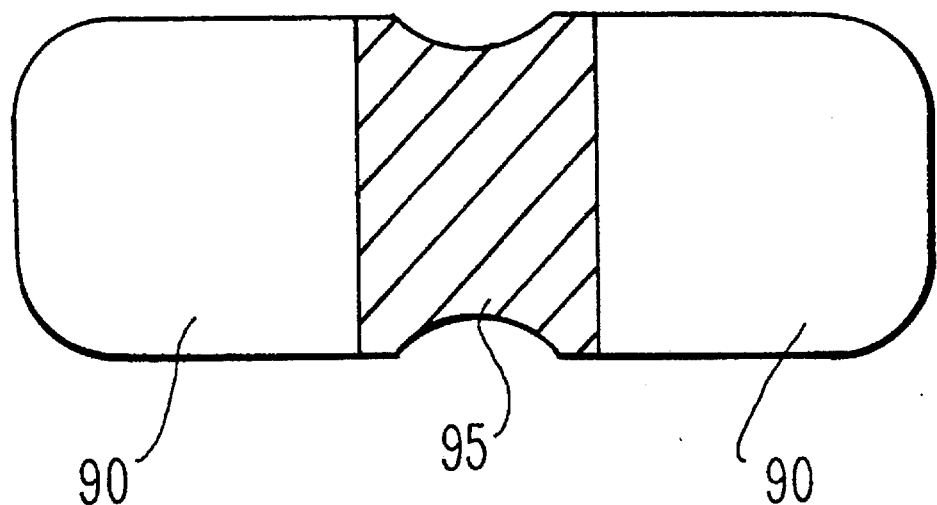

FIG. 3C is an elevational view of the partially overlapped binocular display of FIG. 3B. It can be seen in FIG. 3C that aperture stop 95 is placed substantially in front of eyepieces 90 in such a manner as to cover the medial edge of both fields of view. In an alternate embodiment, separate stops may be used for each eye. Aperture stop 95 may also be of adjustable width, so that observers with different interpupillary separations can be accommodated. Adjustability can be achieved by a simple slide/lock mechanism or by interchangeable aperture stops that snap on and off of the eyepiece.

Aperture stop 95 may be made from any suitable material which substantially blocks the bserver's view of the binocular boundaries. Such materials include plastic, metal, cardboard, tape, paint on the surface of the lens, etc.

As is apparent to one skilled in the art, the focal planes 50 may be real film images, the surface of a cathode ray tube, a liquid crystal display, or some other form of video imaging device.

Figure 4:
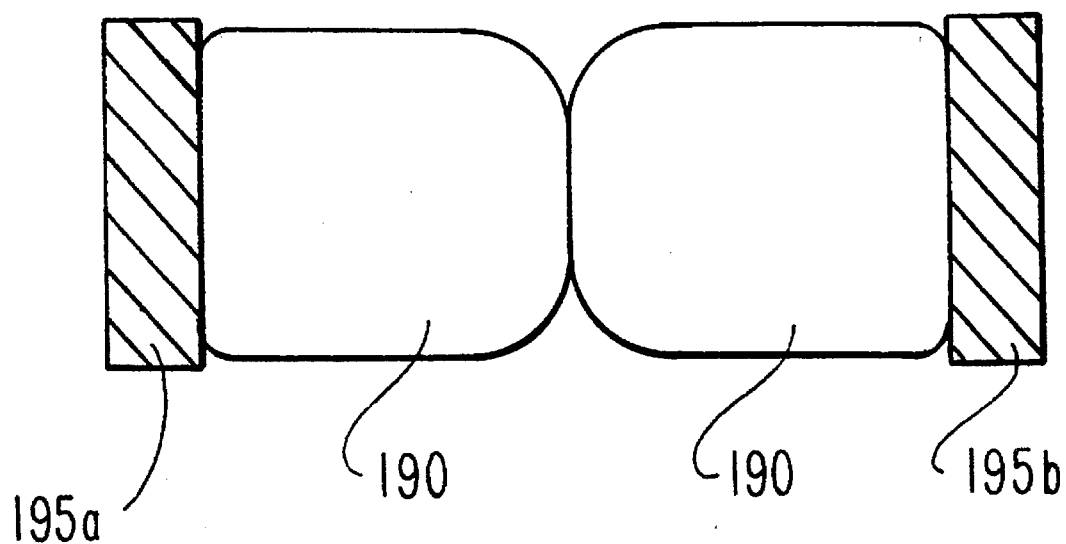
FIG. 4 is an elevational view of a convergent binocular display having an aperture stop in accordance with the present invention.

Although FIGS. 3A–3C show using an aperture stop for a divergent binocular display, the principles of the present invention may be applied equally well to convergent binocular displays. FIG. 4 is an elevational view of a convergent binocular display having aperture stops 195a and 195b positioned in accordance with the present invention. Aperture stops 195a and 195b are placed substantially in front and near the outer edges of eyepieces 190 so as to block the observer's view of the binocular boundaries which in this convergent case are the temporal edges of the left and right fields of view. The binocular boundaries thus appear out of focus and undistracting to the observer.

Figure 5:
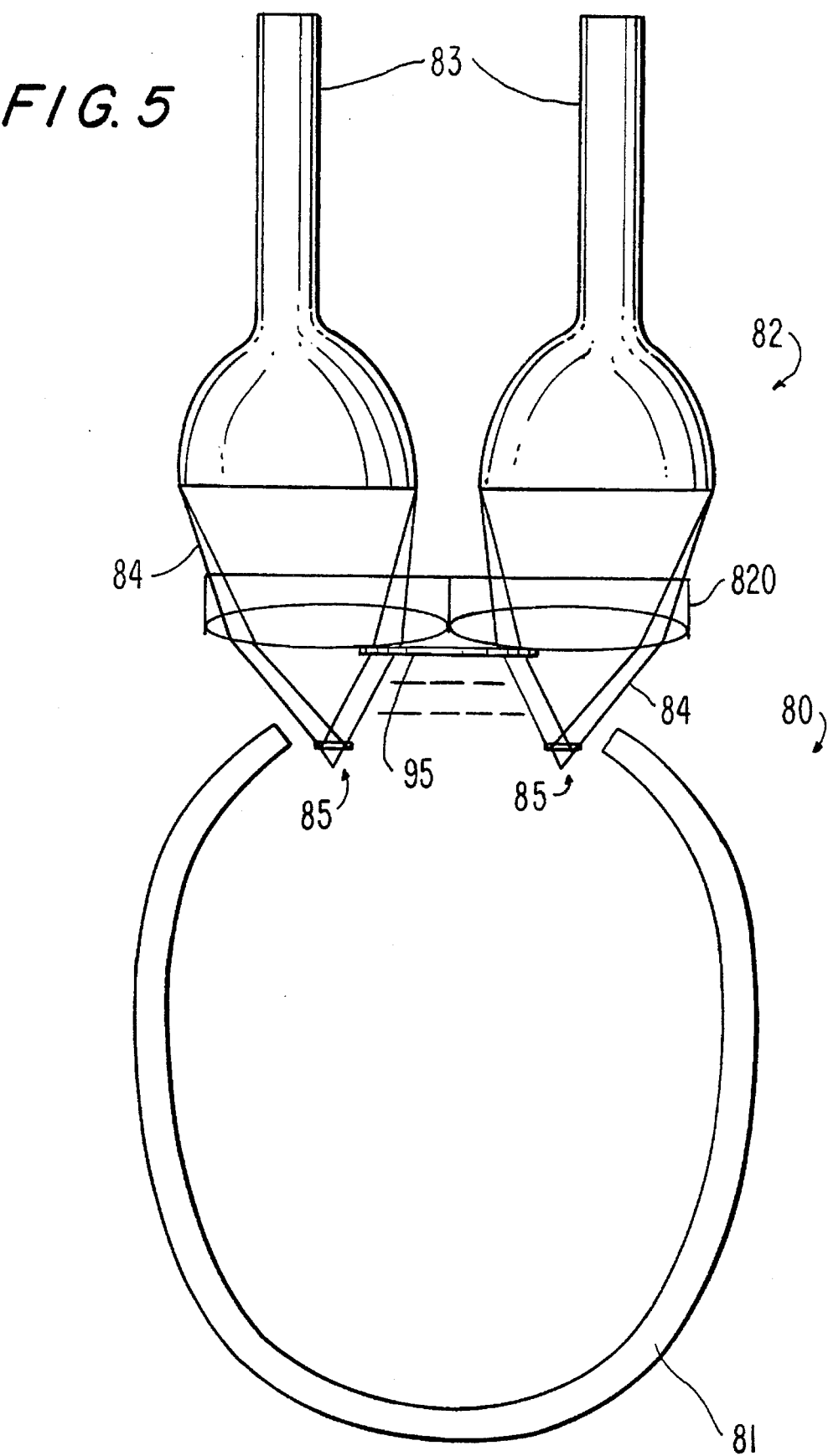
FIG. 5 is a schematic representation of a first preferred embodiment of an HMD employing an aperture stop in accordance with the present invention.

FIG. 5 exemplifies the use of the present invention in an HMD. In a preferred embodiment, the HMD 80 shown in FIG. 5 is used in a theme park attraction to display visual imagery that immerses the observer in a virtual world. Head frame 81, which is placed on the head of the observer (not shown), is attached to optical system 82. Appropriately produced images (e.g., images produced by cathode ray tubes 83), as represented by rays 84, are directed by optics 820 toward eye opening 85 in head frame 81 so that they may be viewed by an observer wearing head frame 81. The particular design of optics 820 forms no part of, and does not affect the operation of, the present invention. However, it is particularly preferred that the direct-view arrangement of FIG. 5 be used, as opposed to the rear projection arrangement of FIG. 6 (below), because it allows aperture stop 95 to be substantially vertical, and thus substantially uniformly out of focus.

In this example, each of the left and right fields of view are preferably 60°, preferably with 50° of overlap, thereby producing a total field of view of 70°. Aperture stop 95 is positioned so as to render the binocular boundaries out of focus and thus less distracting to an observer, in the manner described above. With the direct-view arrangement of FIG. 5, aperture stop 95 is substantially vertical and thus substantially uniformly out of focus, as discussed above.

Figure 6:
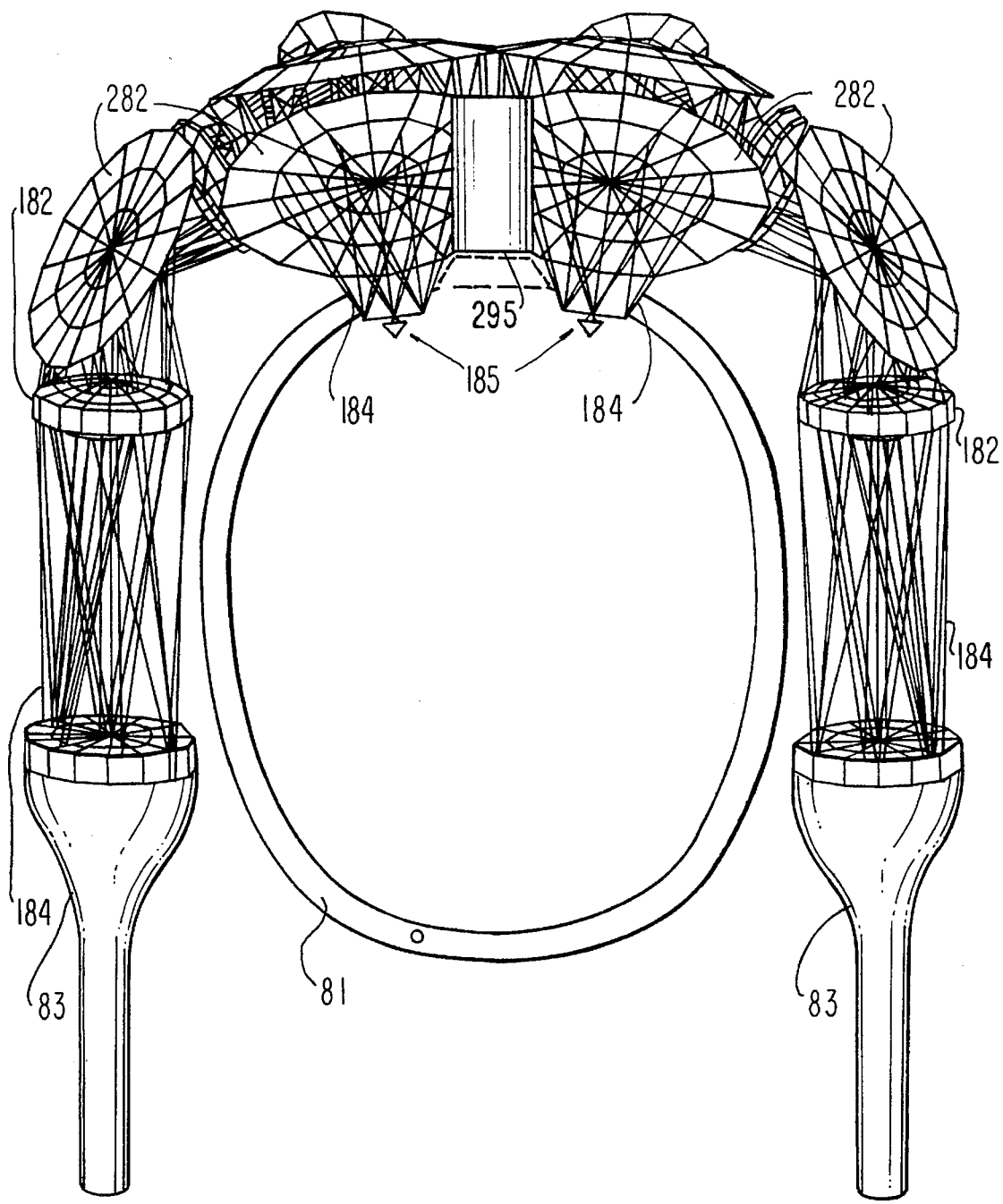
FIG. 6 is a schematic representation of a second preferred embodiment of an HMD employing an aperture stop in accordance with the present invention.

In a second preferred embodiment 180, shown in FIG. 6, cathode ray tubes 83 are located behind the observer, and the images, shown by rays 184, are directed by both refractive optics 182 and reflective optics 282 toward eye openings 185. This embodiment is less preferred because aperture stop 295 has to be inclined slightly away from the observer, so that different parts of it are out of focus by different amounts.

In this example, each of the left and right fields of view are preferably 55°, preferably with 40° of overlap, thereby again producing a total field of view of 70°. Aperture stop 295 is positioned so as to render the binocular boundaries out of focus and thus less distracting to the observer, in the manner described above.

Thus, the use of an aperture stop to render the binocular boundaries of a partially overlapped binocular display out of focus and thus practically invisible to an observer has been described. One skilled in the art will appreciate that the present invention can be practiced by other than the described embodiments, which are presented for purposes of illustration and not of limitation, and the present invention is limited only by the claims which follow.

What is claimed is:

1. A virtual reality system having a partially overlapped binocular display for displaying simulated three dimensional images to an observer, the partially overlapped binocular display comprising, a generator of a first image having a first boundary;

a generator of a second image having a second boundary; wherein:

the first and second images are generated such that a predetermined portion of the first image overlaps a predetermined portion of the second image thereby forming a first nasal portion of the first boundary which overlaps the second image and a second nasal portion of the second boundary which overlaps the first image, the system further comprising:

an aperture step positioned in front of the first and second images, and closer to an eye of the observer than the focal renee or said eye, so as to substantially block the observer's view of the left nasal boundary and the right nasal boundary, the aperture stop being substantially out of focus to the observer.

2. The apparatus defined in claim 1 wherein the aperture stop is a single piece.

3. The apparatus defined in claim 1 wherein the aperture stop comprises two pieces.

4. The apparatus defined in claim 1 wherein the first and second images overlap to form a divergent overlapped image.

5. The apparatus defined in claim 1 wherein the first and second images overlap to form a convergent overlapped image.

6. The apparatus defined in claim 1 wherein the aperture stop has vertical edges.

7. The apparatus defined in claim 1 wherein the partially overlapped binocular display is used in a head mounted display.

8. The apparatus defined in claim 1 wherein:

the partially overlapped binocular display includes first and second eyepieces through which the observer views the first and second monocular images; and the aperture stop is positioned substantially in front of the first and second eyepieces in order to substantially block the observer's view of the first portion of the first boundary and the second portion of the second boundary.

9. The apparatus defined in claim 8 wherein the aperture stop is a single piece.

10. The apparatus defined in claim 8 wherein the first and second images overlap to form a divergent overlapped image.

11. The apparatus defined in claim 8 wherein the aperture stop has vertical edges.

12. The apparatus defined in claim 8 wherein the partially overlapped binocular display is used in a head mounted display.

13. In a virtual reality system having a partially overlapped binocular display for displaying simulated three dimensional images to an observer, apparatus for decreasing the noticeability of binocular boundaries in the partially overlapped binocular display comprising:

a generator of a first monocular image;

a generator of a second monocular image; wherein:

the first and second images are generated such that a predefined portion of the first menocular image overlaps a predefined portion of the second monocular image in order to form an overlapped binocular region having a plurality of binocular boundary segments comprising a left nasal boundary and a right nasal boundary; the apparatus further comprising:

an aperture stop positioned substantially in front of the first and second images, and closer to an eye of the observer than the focal range of said eye, such that the observer's view of the left nasal boundary and the right nasal boundary is substantially blocked, the aperture stop being substantially cut of focus to the observer.

14. The apparatus defined in claim 13 wherein the first and second monocular images overlap to form a divergent overlapped image.

15. The apparatus defined in claim 13 wherein the first and second monocular images overlap to form a convergent overlapped image.

16. The apparatus defined in claim 13 wherein the aperture stop is a single piece.

17. The apparatus defined in claim 13 wherein the aperture stop comprises two pieces.

18. The apparatus defined in claim 13 wherein the aperture stop has vertical edges.

19. The apparatus defined in claim 13 wherein the partially overlapped binocular display is used in a head mounted display.

20. The apparatus defined in claim 13 wherein:

the partially overlapped binocular display includes first and second eyepieces through which the observer views the first and second monocular images; and the aperture stop is positioned substantially in front of the first and second eyepieces.

21. The apparatus defined in claim 20 wherein the aperture stop is substantially out of focus to the observer.

22. The apparatus defined in claim 20 wherein the aperture stop is a single piece.

23. The apparatus defined in claim 20 wherein the aperture stop has vertical edges.

24. The apparatus defined in claim 20 wherein the first and second monocular images overlap to form a divergent overlapped image.

25. The apparatus defined in claim 20 wherein the partially overlapped binocular display is used in a head mounted display.

26. In a virtual reality system having a partially overlapped binocular display for displaying simulated three dimensional images to an observer, a method of decreasing the noticeabillty of binocular boundaries in the partially overlapping binocular display comprising the steps of:

generating a first monocular image;

generating a second monocular image;

overlapping a predefined portion of the second monocular image and a predefined portion of the first monocular image in order to form an overlapped binocular region having a plurality of binocular boundary segments comprising a left nasal boundary and a right nasal boundary; and substantially blocking the observer's view of the left nasal boundary and the right nasal boundary by positioning an aperture stop substantially in front of the first and second images, and closer to an eye of the observer than the focal range of said eye, in order to substantially block the observer's view of the left nasal boundary and the right nasal boundary, the aperture stop being substantially out of focus to the observer.

27. The method defined in claim 26 wherein the step of overlapping a predefined portion of the second monocular image and a predefined portion of the first monocular image comprises the step of overlapping the first and second monocular images to form a divergent image.

28. The method defined in claim 26 wherein the step of overlapping a predefined portion of the second monocular image and a predefined portion of the first monocular image comprises the step of overlapping the first and second monocular images to form a convergent image.

* * * * *